United States Patent [19]
Hall, III

[11] Patent Number: 5,520,588
[45] Date of Patent: May 28, 1996

[54] POWER TRANSMISSION

[75] Inventor: Arthur Hall, III, Cicero, Ind.

[73] Assignee: General Motors Corporation, Detroit, Mich.

[21] Appl. No.: 434,437

[22] Filed: May 3, 1995

[51] Int. Cl.$^6$ ............................................ F16H 3/44
[52] U.S. Cl. .................................... 475/218; 475/219
[58] Field of Search ............................ 475/207, 218, 475/219

[56] References Cited

U.S. PATENT DOCUMENTS

| | | | |
|---|---|---|---|
| 3,505,905 | 4/1970 | Lepelletier | 475/218 |
| 3,929,037 | 12/1975 | Marsch | 475/218 |
| 4,200,006 | 4/1980 | Ehrlinger et al. | 475/207 |
| 5,013,289 | 5/1991 | Van Maanen | 475/219 |
| 5,039,305 | 8/1991 | Pierce | 475/219 |

FOREIGN PATENT DOCUMENTS 4419793  12/1994  Germany ............................ 475/219

Primary Examiner—Dirk Wright
Attorney, Agent, or Firm—Donald F. Scherer

[57]  ABSTRACT

A multi-speed power transmission has two simple planetary gear sets interconnected to provide a multi-speed planetary arrangement. The planetary arrangement has input members selectively connectible by a plurality of friction clutches to a prime mover through two distinct input ratio gear sets. One member of the one of the simple planetary gear sets is selectively connectible individually with both input ratio gear sets via two of the clutches. Two additional clutches and two friction brakes are also included, whereby eight forward speeds and two reverse speeds are attainable by engaging selective combinations of the clutches or clutch and brake.

5 Claims, 1 Drawing Sheet

U.S. Patent　　　May 28, 1996　　　5,520,588
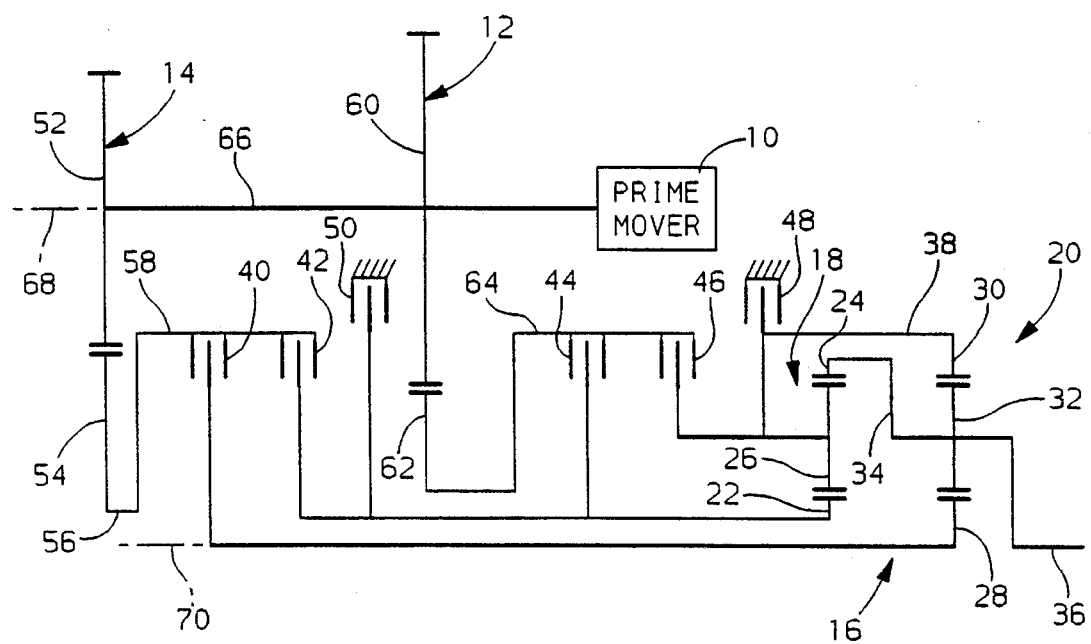

POWER TRANSMISSION

TECHNICAL FIELD

This invention relates to power transmissions, and more particularly, to multi-speed planetary power transmissions.

BACKGROUND OF THE INVENTION

Multi-speed power transmissions are used in many large trucks which operate under various conditions of load. The trucks may be fully loaded and therefore require many speed steps or ratios in the transmission to make full use of the engine speed and torque range, and acceleration capabilities. The truck may also be lightly loaded or empty. Under these conditions, the operator may desire a transmission with fewer speed steps or ratios so that the top running gear can be reached with fewer shifts or ratio interchanges.

SUMMARY OF THE INVENTION

It is an object of the present invention to provide an improved planetary power transmission, wherein a plurality of gear ratios are provided and wherein fewer than the maximum number of gear ratios can be easily utilized without double transition shifts.

One aspect of this invention is seen in an eight speed planetary transmission having two distinct ratio input spur gear sets which are drivingly connectable with a pair of simple planetary gear sets.

Another aspect of this invention is to provide a planetary gear arrangement having two spur gear ratio inputs which are selectively connectible therewith by clutches so as to provide an eight speed power transmission which, by selective actuation of the clutches and included brakes, may also provide a six speed power transmission with single transition shifts in all of the transmission ranges.

The present invention provides a power transmission with up to eight forward speeds and two reverse speeds. This power transmission has two simple planetary gear sets and two input transfer trains. The transfer trains are connected with the planetary gear sets via four clutches and two brakes are provided to establish reaction members in the planetary gear set. The planetary arrangement with the associated input gearing can provide a ratio coverage which can vary from more than 9:1 to less than 6:1. The ratio steps between adjacent ratios follow a substantially geometric progression of larger steps between lower ranges and smaller steps between upper ranges.

For less ratio coverage or more rapidly reaching the maximum ratio, it may be desirable to skip shifts and have less than eight individual forward ranges or ratios. This is possible with the present invention and it is also within the present invention to provide the ratio interchanges with single transition shifts.

DESCRIPTION OF THE DRAWING

The drawing is a schematic representation of a power transmission incorporating the present invention.

DESCRIPTION OF AN EXEMPLARY EMBODIMENT

The drawing depicts a prime mover 10, such as an internal combustion engine, a pair of ratio input structures, in the form of meshing gear sets, 12 and 14, and a planetary gear arrangement 16. The planetary gear arrangement 16 includes two simple planetary gear sets 18 and 20. The planetary gear set 18 has a sun gear 22, a ring gear 24 and a carrier assembly 26. The planetary gear set 20 has a sun gear 28, a ring gear 30 and a carrier assembly 32. The ring gear 24 and carrier assembly 32 are interconnected by a hub 34 and are also connected to an output shaft 36. The carrier assembly 26 and ring gear 30 are interconnected by a hub member 38.

The sun gear 28 is selectively connectible to the ratio input 14 through a selectively engageable fluid operated friction clutch generally designated 40. The sun gear 22 is also selectively connectible with the ratio input 14 via a fluid operated selectively engageable friction clutch 42. The sun gear 22 is also selectively connectible via a fluid operated friction clutch 44 with the ratio input 12. A conventional fluid operated friction clutch 46 is provided to selectively connect the carrier assembly 26 with the ratio input 12.

The hub 38 is selectively groundable or can be held stationary by a conventional fluid operated selectively engageable friction brake 48. The sun gear 22 can be held stationary by a fluid operated selectively engageable friction brake 50.

The ratio inputs 12 and 14 are shown as spur gear assemblies, wherein the ratio input 14 has a gear 52 and a gear 54 meshing therewith. The gear 54 has an output member or shaft 56 which is drivingly connected with a hub 58 which provides an input member for the clutches 40 and 42. The ratio input 12 is comprised of a pair of gears 60 and 62. The gear 62 also has drivingly connected therewith a hub 64 which provides an input member for the clutches 44 and 46.

The gears 60 and 52 are both drivingly connected with an input shaft or power shaft 66 which is drivingly connected with the prime mover 10. Accordingly, whenever the prime mover 10 is being operated, the shaft 66 will be rotated.

While the ratio inputs 12 and 14 are shown and described as meshing gear components, it is well within the skill of the artisan to utilize chain drives or similar input drive devices. The input shaft or power shaft 66 is disposed on an axis 68 which is parallel with an axis 70 on which the planetary gear sets 18 and 20 are rotatably disposed and also provides the axis of rotation for the output shaft 36. The axes 68 and 70 are parallel. The use of parallel shafts between the power transmission input and output is well known and has been utilized for many years in both transverse front wheel drive transmissions as well as transmissions for many track laying vehicles.

Through selective engagement of the clutches 40, 42, 44 and 46 and brakes 48 and 50, eight forward speeds and two reverse speed ratios are possible with the above described planetary gear arrangement 16. If the clutch 40 and brake 48 are engaged, the lowest forward speed ratio of the transmission will be accomplished. To change from the low or first speed ratio to the second speed ratio, the brake 48 is disengaged while the brake 50 is engaged with the clutch 40 remaining engaged.

To establish the third forward ratio, the brake 50 is disengaged and the clutch 42 is engaged. To establish the fourth ratio, the clutch 42 is disengaged and the clutch 44 is engaged. To establish the fifth ratio, the clutch 44 is disengaged and the clutch 46 is engaged. To establish the sixth ratio, the clutch 40 is disengaged and the clutch 44 is engaged. To establish the seventh ratio, the clutch 44 is disengaged and the clutch 42 is engaged. To establish the eighth forward ratio, the clutch 42 is disengaged and the brake 50 is engaged. To establish the lowest or first reverse ratio, the clutch 42 and brake 48 are engaged. This provides a reverse drive within the planetary gear set 18. To establish the second reverse ratio, the clutch 44 is engaged and the brake is engaged. This likewise provides a reverse ratio within the planetary gear set 18.

Single transition ratio interchanges, up or down, can be made between any two of the first through fifth ratios. For example, first to third, first to fourth or fifth, second to fourth or fifth, and third to fifth. A single transition interchange can be accomplished between any two ratios separated by a single ratio, such as fourth to sixth. Further, single transition interchanges can be accomplished between any two ratios from fifth to eighth, such as fifth to seventh or eighth. The flexibility of the transmission operation should now be apparent to those skilled in the art.

The difference between the first and second reverses is the difference between the ratio inputs 12 and 14. Both of the reverse drives are underdrives and, as mentioned, have a step ratio therebetween equal to the ratio of the inputs 12 and 14. A shift from first to second reverse can be accomplished with a single transition by the mere swapping of clutches 42 and 44.

The first through fifth ratios are underdrive ratios, the sixth ratio is a direct drive ratio and the seventh and eighth ratios are overdrive ratios. The first three ratios are dependent upon the ratio input 14. The first ratio is dependent upon the planetary gear set 20 while the second ratio is dependent upon both planetary gear sets 18 and 20. The third ratio is a direct input from the ratio input 14 and therefore the speed ratio of the input shaft 66 to the output shaft 36 is equal to the ratio of the gears 52 and 54.

The fourth, fifth and seventh ratios are dependent upon both ratio input arrangements 14 and 12, the sixth speed ratio is dependent solely upon the ratio input 12 and the eighth speed ratio is dependent upon the ratio input 12 and the planetary gear set 18. The fourth speed ratio is dependent upon both planetary gear sets 18 and 20, while the fifth speed ratio is dependent upon the planetary gear set 20 and the seventh speed ratio is dependent upon the planetary gear set 18.

With the present invention, the first through fifth and seventh forward speed ratios and the first reverse speed ratio can be affected by changing the input ratio of the gears 52 and 54. The fourth through eighth forward speed ratios and the second reverse speed ratio can be affected by adjusting the ratio of gears 60 and 62.

It should be apparent that the flexibility of the present invention is quite extensive in that a number of combinations of ratio input gears and planetary gear sets can be utilized to establish the desired overall ratio coverage and the steps to be determined between ratios.

The formula for determining the eight forward speed ratios and the two reverse speed ratios are given below:

$F1: (G1/G2)*(S2/(S2 + R2))$ $$F2: \frac{G1/G2}{((S2 + R2)/S2) - (R1/(S1 + R1))*(R2/S2)}$$

$F3: G1/G2$ $$F4: \frac{(G1/G2)*(S2/R2) + (G3/G4)*(S1/(S1 + R1)}{((S2 + R2)/R2) - ((R1)/(S1 + R1))}$$

$F5: (G1/G2)*((S2/(S2 + R2)) + (G3/G4)*((R2/(S2 + R2))$ $F6: G3/G4$ $F7: (G3/G4)*((S1 + R1)/R1) - (G1/G2)*(S1/R1)$

-continued $F8: (G3/G4)*((S1 + R1)/R1)$ $R1: (G1/G2)*(S1/R1)$ $R2: (G3/G4)*(S1/R1)$ By substituting the gear tooth numbers given in the charts below, the various ratios for each gear can be determined as shown also in the following chart.

| Range | Ratio | Step | Ratio | Step | Ratio | Step |
|---|---|---|---|---|---|---|
| | 8 Speed Version 1 | | 8 Speed Version 2 | | 8 Speed Version 3 | |
| F1 | 6.62 | | 5.64 | | 5.20 | |
| | | 1.83 | | 1.83 | | 1.76 |
| F2 | 3.62 | | 3.08 | | 2.95 | |
| | | 1.54 | | 1.54 | | 1.48 |
| F3 | 2.35 | | 2.00 | | 2.00 | |
| | | 1.47 | | 1.35 | | 1.32 |
| F4 | 1.59 | | 1.48 | | 1.51 | |
| | | 1.27 | | 1.22 | | 1.22 |
| F5 | 1.26 | | 1.22 | | 1.24 | |
| | | 1.26 | | 1.22 | | 1.24 |
| F6 | 1.00 | | 1.00 | | 1.00 | |
| | | 1.24 | | 1.21 | | 1.21 |
| F7 | 0.80 | | 0.82 | | 0.82 | |
| | | 1.15 | | 1.18 | | 1.18 |
| F8 | 0.70 | | 0.70 | | 0.70 | |
| R1 | 5.52 | | 4.71 | | 4.71 | |
| | | 2.35 | | 2.00 | | 2.00 |
| R2 | 2.35 | | 2.35 | | 2.35 | |
| Coverage | 9.43 | | 8.03 | | 7.41 | |
| Input | Driver | Driven | Driver | Driven | Driver | Driven |
| 14 | 23 | 54 | 27 | 54 | 27 | 54 |
| 12 | 38 | 38 | 40 | 40 | 40 | 40 |
| Planet Set | Sun | Ring | Sun | Ring | Sun | Ring |
| 18 | 34 | 80 | 34 | 80 | 34 | 80 |
| 20 | 44 | 80 | 44 | 80 | 50 | 80 |
| | 8 Speed Version 4 | | 7 Speed Version 4 | | 6 Speed Version 4 | |
| F1 | 4.24 | | 4.24 | | 4.24 | |
| | | 1.76 | | 1.76 | | 1.76 |
| F2 | 2.41 | | 2.41 | | 2.41 | |
| | | 1.48 | | 1.48 | | 1.48 |
| F3 | 1.63 | | 1.63 | | 1.63 | |
| | | 1.20 | | 1.39 | | 1.39 |
| F4 | 1.35 | | 1.17 | | 1.17 | |
| | | 1.15 | | 1.17 | | 1.37 |
| F5 | 1.17 | | 1.00 | | 0.86 | |
| | | 1.17 | | 1.16 | | 1.22 |
| F6 | 1.00 | | 0.86 | | 0.70 | |
| | | 1.16 | | 1.22 | | |
| F7 | 0.86 | | 0.70 | | | |
| | | 1.22 | | | | |
| F8 | 0.70 | | | | | |
| R1 | 3.83 | | 3.83 | | 3.83 | |
| | | 1.63 | | 1.63 | | |
| R2 | 2.35 | | 2.35 | | 2.35 | |
| Coverage | 6.04 | | 6.04 | | 6.04 | |
| Input | Driver | Driven | Driver | Driven | Driver | Driven |
| 14 | 27 | 44 | 27 | 44 | 27 | 44 |
| 12 | 36 | 36 | 36 | 36 | 36 | 36 |
| Planet Set | Sun | Ring | Sun | Ring | Sun | Ring |
| 18 | 34 | 80 | 34 | 80 | 34 | 80 |
| 20 | 50 | 80 | 50 | 80 | 50 | 80 |

As can be seen from the above charts, the gears 52 and 54 of the ratio input 14 are changed between Versions 1 and 2 resulting in a change of the first, second, third, fourth, fifth and seventh speed ratios. The change in the gears of input ratio 14 also results in a change in the overall coverage of the planetary gear set.

Version 3 is a change from Version 2 resulting from a change in the number of gear teeth on the sun gear 28 of the planetary gear set 20. As can be seen from the chart, this will effect a change in the first and second ratios, the fourth ratio and the fifth ratio. In the change from Version 3 to Version 4, the input ratio 14 is changed by reducing the number of teeth on the driven gear 54. It will be noted that the number of teeth on the gears 60 and 62 of the input ratio 12 is also changed, however, the overall ratio of this set remains at 1:1. These changes are made to accommodate the shaft spacing which will occur when the tooth number changes are made on the input ratio 14.

Version 4 is repeated as a seven speed transmission and as a six speed transmission. Thus, in the six speed Version 4, the overall ratio coverage of 6.04 remains the same, however, in going from a low speed of 4.24 to the highest speed of 0.70, only five ratio interchanges are required. While providing the same coverage, the eight speed version 4 undergoes seven ratio interchanges. It should be noted that the steps between ratios remains well within the desired design parameters for such transmissions as those described herein and all of the ratio changes are of the single transition type.

I claim:

1. A multi-speed power transmission comprising:

a first pair of input gears rotatably mounted on parallel axes and providing a first ratio between the axes;

a second pair of input gears rotatably mounted on the axes and providing a second ratio;

a planetary gear arrangement rotatably mounted on one of the axes and having first and second sun gears, first and second carrier gear assemblies and first and second ring gears, said first ring gear and said second carrier gear assembly being connected for unitary rotation, said first carrier gear assembly and said second ring gear being connected for unitary rotation;

an output member connected with said second carrier gear assembly;

first and second clutch means selectively connectible between one of said first pair of input gears and said second and first sun gears, respectively, for direct input power thereto;

first brake means for selectively holding said first sun gear stationary;

second brake means for selectively holding said first carrier gear assembly and said second ring gear stationary;

third clutch means for selectively connecting said first sun gear with one of said second pair of input gears;

fourth clutch means for selectively connecting said one of said second pair of input gears with said first carrier gear assembly;

said first second and third clutch means and said first and second brake means being connected in selective combinations to provide four forward speeds and two reverse speeds;

said first, second, third and fourth clutch means and said first brake means being connectible in selective combinations to provide four forward speed ratios distinct from said first four forward speed ratios.

2. The transmission defined in claim 1, wherein the two reverse ratios are separated by a step ratio equal to the ratio of the first pair of input gears to the second pair of input gears.

3. The transmission defined in claim 1, wherein a single transition ratio interchange is possible between any two of the five lowest forward speed ratios.

4. The transmission defined in claim 3, wherein a single transition ratio interchange is possible between any two of the four highest forward speed ratios.

5. The transmission defined in claim 4, wherein a single transition ratio interchange is possible between any two forward speed ratios separated by one forward speed ratio.

* * * * *